US010144313B2

(12) United States Patent
Ito

(10) Patent No.: US 10,144,313 B2
(45) Date of Patent: Dec. 4, 2018

(54) DECELERATION DEVICE AND SEAT DRIVE DEVICE

(71) Applicant: AISIN SEIKI KABUSHIKI KAISHA, Kariya-shi, Aichi-ken (JP)

(72) Inventor: Sadao Ito, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 252 days.

(21) Appl. No.: 15/100,016

(22) PCT Filed: Nov. 25, 2014

(86) PCT No.: PCT/JP2014/081038
§ 371 (c)(1),
(2) Date: May 27, 2016

(87) PCT Pub. No.: WO2015/083577
PCT Pub. Date: Jun. 11, 2015

(65) Prior Publication Data
US 2018/0154802 A1 Jun. 7, 2018

(30) Foreign Application Priority Data

Dec. 3, 2013 (JP) ................................ 2013-250147

(51) Int. Cl.
*B60N 2/20* (2006.01)
*B60N 2/22* (2006.01)
(Continued)

(52) U.S. Cl.
CPC ......... *B60N 2/2254* (2013.01); *B60N 2/2245* (2013.01); *B60N 2/2252* (2013.01);
(Continued)

(58) Field of Classification Search
CPC .. B60N 2/2252; B60N 2/2254; B60N 2/2245; B60N 2002/0236; B60N 2002/024; F16H 1/32
(Continued)

(56) References Cited

U.S. PATENT DOCUMENTS 5,586,833 A * 12/1996 Vossmann ............ B60N 2/2252
297/361.1
6,331,034 B1 * 12/2001 Specht ................. B60N 2/0232
297/362.11 X
(Continued)

FOREIGN PATENT DOCUMENTS

JP 1-158249 A 6/1989
JP 2000-97295 A 4/2000
(Continued)

OTHER PUBLICATIONS

English language translation of International Preliminary Report on Patentability (Form PCT/IB/373) and the Written Opinion of the International Searching Authority (Form PCT/ISA/237) dated Jun. 7, 2016, in the corresponding International Application No. PCT/JP2014/081038. (5 pages).
(Continued)

*Primary Examiner* — Rodney B White
(74) *Attorney, Agent, or Firm* — Buchanan Ingersoll & Rooney PC

(57) ABSTRACT

A deceleration device comprising first and second gears that have different numbers of teeth. A cam mechanism is disposed on the same axis as the first gear, engages the first gear with the second gear in a state of eccentricity. A connecting shaft is disposed on the same axis as the first gear and is connected to the cam mechanism. A rotating body is disposed on the same axis as the second gear and is connected to the connecting shaft. When the connecting shaft is inserted into a long hole of the rotating body, the
(Continued)

rotating body is connected to the connecting shaft in an eccentric position. The major axis of the long hole is set so as to allow the rotating body and the connecting shaft to move relative to one another along the longitudinal direction of the long hole.

9 Claims, 14 Drawing Sheets

(51) Int. Cl.
*B60N 2/225* (2006.01)
*F16H 1/32* (2006.01)
*B60N 2/02* (2006.01)

(52) U.S. Cl.
CPC ..... *B60N 2002/024* (2013.01); *B60N 2002/0236* (2013.01); *F16H 1/32* (2013.01)

(58) Field of Classification Search
USPC .............................................. 297/362.11, 363
See application file for complete search history.

(56) References Cited

U.S. PATENT DOCUMENTS

| | | | | |
|---|---|---|---|---|
| 7,329,200 | B2 * | 2/2008 | Schuler | B60N 2/0232 297/362.11 |
| 8,672,408 | B2 * | 3/2014 | Legras | B60N 2/2255 297/361.1 |
| 8,783,774 | B2 * | 7/2014 | Berres | B60N 2/0232 297/362.11 X |
| 8,974,000 | B2 * | 3/2015 | Navatte | B60N 2/0232 297/362.11 |
| 2006/0006716 | A1 * | 1/2006 | Rohee | B60N 2/2356 297/361.1 |
| 2007/0029893 | A1 * | 2/2007 | Schuler | B60N 2/0232 297/362.11 X |
| 2008/0197686 | A1 * | 8/2008 | Liebich | B60N 2/2252 297/361.1 |
| 2009/0301247 | A1 | 12/2009 | Mitsuhashi et al. | |
| 2010/0244530 | A1 * | 9/2010 | Kitano | B60N 2/20 297/361.1 X |
| 2012/0119554 | A1 | 5/2012 | Berres et al. | |
| 2012/0205956 | A1 * | 8/2012 | Nock | B60N 2/2252 297/362.11 X |
| 2014/0167475 | A1 * | 6/2014 | Pera | B60N 2/0232 297/354.1 |
| 2014/0238188 | A1 | 8/2014 | Ito | |
| 2014/0239693 | A1 * | 8/2014 | Nock | B60N 2/20 297/361.1 |
| 2015/0246625 | A1 * | 9/2015 | Leconte | B60N 2/2252 297/361.1 |
| 2015/0258918 | A1 * | 9/2015 | Chang | B60N 2/2252 297/361.1 X |
| 2015/0283924 | A1 * | 10/2015 | Boutouil | B60N 2/2251 297/362 |
| 2015/0291063 | A1 * | 10/2015 | Enokijima | A47C 1/025 297/361.1 |
| 2017/0267125 | A1 * | 9/2017 | Fujita | B60N 2/06 |
| 2018/0105072 | A1 * | 4/2018 | Pons | B64D 11/064 |

FOREIGN PATENT DOCUMENTS

JP     2001-165248 A    6/2001
WO     WO 2008/015845 A1    2/2008

OTHER PUBLICATIONS

International Search Report (PCT/ISA/210) dated Mar. 3, 2015, by the Japanese Patent Office as the International Searching Authority for International Application No. PCT/JP2014/081038.

* cited by examiner

DECELERATION DEVICE AND SEAT DRIVE DEVICE

TECHNICAL FIELD

The present invention relates to a deceleration device and a seat drive device.

BACKGROUND ART

A conventional deceleration device may include a cam mechanism that moves the position where a first gear and a second gear are engaged in accordance with the received drive torque. The number of teeth of the first gear differs from the number of teeth of the second gear. One of an inner teeth gear and an outer teeth gear is the first gear, and the other one of the inner and outer teeth gears is the second gear. The cam mechanism is coaxial with the first gear and rotationally supported by the first gear. The cam mechanism is capable of engaging the first gear with the second gear in an eccentric state and moving the engaged position of the first gear and the second gear in accordance with the received drive torque.

In such a deceleration device, when the engaged position of the first gear and the second gear moves, the first and second gears rotate relative to each other to decelerate rotation drive received by the cam mechanism at a high deceleration ratio. For example, Patent Document 1 discloses a seat drive device in which such a deceleration device is located between a seat cushion and a seat back so that the seat drive device functions as a reclining device capable of adjusting an inclination angle of the seat back.

More specifically, in the seat drive device, the deceleration device that forms the reclining device includes a first member including the inner teeth gear, which is the first gear, and a second member including the outer teeth gear, which is the second gear. The first member is fixed to the seat back, and the second member is fixed to the seat cushion. Further, such a reclining device is often arranged at each lateral side of the seat back. In the two reclining devices, a coupling shaft extending in the lateral direction of the seat couples the cam mechanisms that are coaxial with the inner teeth gear (first gear).

Further, the conventional seat drive device includes an actuator device that decelerates the rotation produced by a motor serving as a drive source and outputs the decelerated rotation. For example, the actuator device is fixed to one side of the seat cushion, and a deceleration gear of the actuator device is arranged coaxially with the outer teeth gear (second gear) of the deceleration device that forms the reclining device. The deceleration gear includes a coupling hole for the coupling shaft arranged at an eccentric position that is separated from the rotation center.

More specifically, in the deceleration device of each of the reclining devices, when one of the first gear and the second gear is set as a reference, the other one virtually swings and rotates over a predetermined eccentricity amount that is set between the two gears.

Thus, in the conventional seat drive device, the coupling hole is formed in advance at a predetermined eccentric position corresponding to the eccentricity amount, and the coupling shaft is coupled to the deceleration gear serving as a rotor that receives drive torque. As a result, the coupling shaft revolves around the rotation shaft of the rotor. This allows the drive torque of the actuator device, which is arranged on the non-rotatable seat cushion, to be transmitted to the cam mechanism of each reclining device that swings and rotates with the seat back.

PRIOR ART DOCUMENT

Patent Document

Patent Document 1: U.S. Patent Application Publication No. 2012/0119554

SUMMARY OF THE INVENTION

Problems that are to be Solved by the Invention

However, the eccentricity amount between the first and second gears is not always constant. The eccentricity amount changes in accordance with the relative positional relationship of the members of the deceleration device because of, for example, the manufacturing and coupling errors of each member or wear over time. Thus, in the conventional seat drive device, the actual eccentricity amount may differ from the eccentric position set for the coupling hole of the deceleration gear. Since this may hinder smooth movement, there is still room for improvement.

It is an object of the present invention to provide a deceleration device and a seat drive device that moves further smoothly.

Means for Solving the Problem

According to one aspect of the present invention, a deceleration device is provided. The deceleration device includes a first gear including either one of inner teeth and outer teeth and having a first number of teeth and a second gear including the other one of the inner teeth and the outer teeth and having a second number of teeth, which differs from the first number of teeth. The deceleration device further includes a cam mechanism that is arranged coaxially with the first gear and rotationally supported by the first gear. The cam mechanism is configured to cause the first gear to be engaged with the second gear in an eccentric state and receive drive torque to move a position where the first gear and the second gear are engaged. The deceleration device further includes a coupling shaft that is arranged coaxially with the first gear and coupled to the cam mechanism and a rotor that is arranged coaxially with the second gear and coupled to the coupling shaft. The rotor is configured to enable the drive torque to be received by the cam mechanism through the coupling shaft. The rotor includes an elongated hole that extends in a radial direction through a rotation center and is configured to allow the coupling shaft to be inserted into the elongated hole. When the coupling shaft is inserted into the elongated hole, the rotor is coupled to the rotation shaft at an eccentric position corresponding to an eccentricity amount that is set between the first gear and the second gear. The elongated hole has a major axis set to allow relative movement of the rotor and the coupling shaft in a longitudinal direction of the elongated hole.

In another aspect, a seat drive device including the deceleration device is provided. The deceleration device is located between two seat members.

EMBODIMENTS OF THE INVENTION

First Embodiment

A first embodiment of a deceleration device applied to a vehicle seat drive device will now be described with reference to the drawings.

Figure 1:
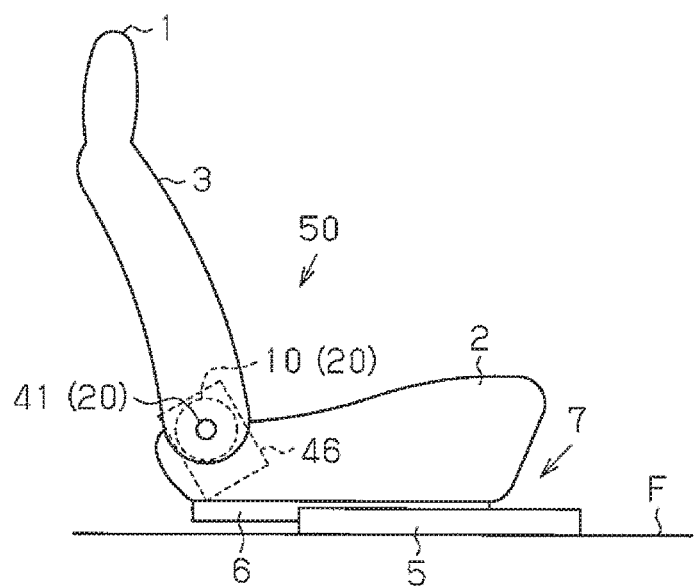
FIG. 1 is a schematic view showing a seat drive device.

As shown in FIG. 1, a vehicle seat 1 includes a seat cushion 2 and a seat back 3. The seat cushion 2 and the seat back 3 are seat members. The seat back 3 is arranged at a rear end of the seat cushion 2. Left and right lower rails 5 are arranged on a vehicle floor F. Each of the lower rails 5 includes an upper rail 6 that moves relative to the lower rail 5. The seat 1 is supported by the upper rails 6.

A seat sliding device 7 is formed by the lower rails 5 and the upper rails 6 that are movable relative to each other. A vehicle occupant uses the function of the seat sliding device 7 to enable adjustment of a seat position in a front-to-rear direction of the vehicle.

A reclining device 10 is arranged between the seat cushion 2 and the seat back 3. The reclining device 10 is able to restrict and allow pivoting of the seat back 3 relative to the seat cushion 2. A vehicle occupant can use the function of the reclining device 10 to adjust the inclination angle of the seat back 3.

Figure 2:
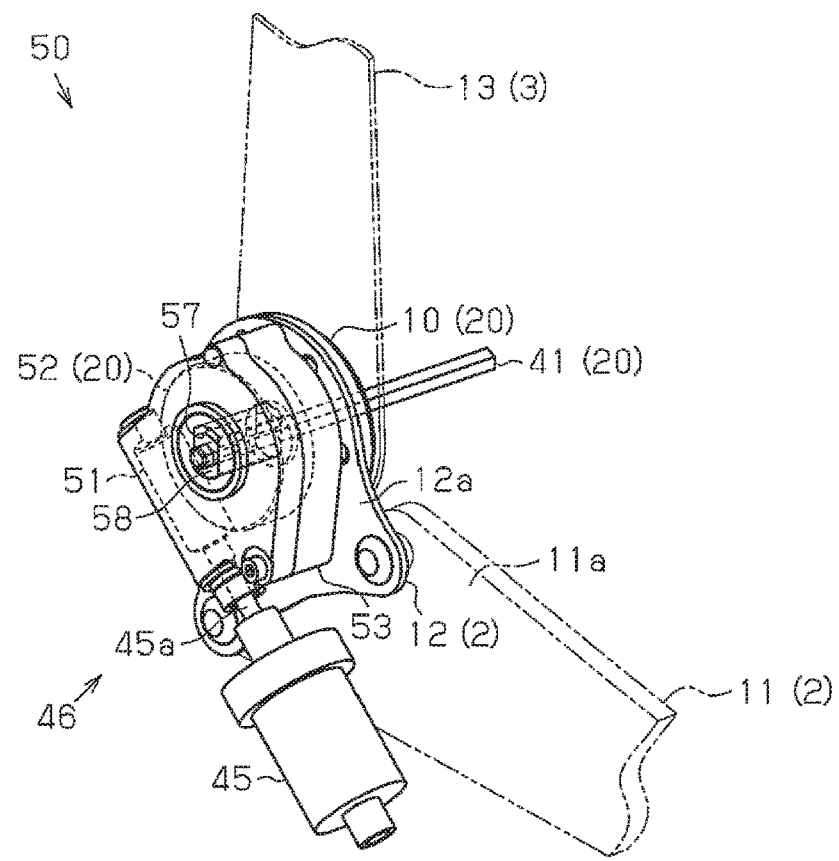
FIG. 2 is a perspective view showing the seat drive device.
Figure 3A:
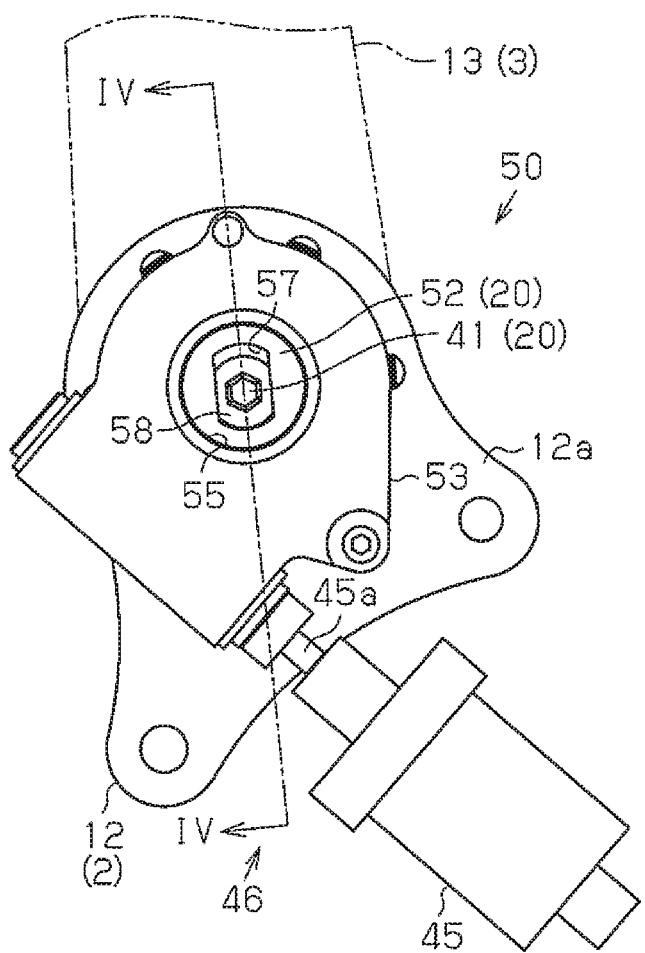
FIG. 3A is a side view showing a first embodiment of the seat drive device.

In detail, as shown in FIGS. 2 and 3A, two lower arms 11 are located at the two sides of the seat cushion 2, and a supporting plate 12 extends upward from a rear end 11a of each of the lower arms 11. The seat back 3 is located at the rear end of the seat cushion 2 and held between the supporting plates 12. A seat back frame 13 is arranged at each lateral side of the seat back 3. The reclining device 10 is located between the seat back frame 13 and the supporting plate 12.

In further detail, as shown in FIGS. 4 to 7, the reclining device 10 includes an inner teeth gear 15, an outer teeth gear 16, and a cam mechanism 18 used to engage the inner teeth gear 15 and the outer teeth gear 16 in an eccentric state. The number of teeth of the inner teeth gear 15 differs from the number of teeth of the outer teeth gear 16. These members form a deceleration device 20. The reclining device 10 is a Taumel reclining device capable of adjusting the inclination angle of the seat back 3 using the function of the deceleration device 20.

For example, the reclining device 10 includes a first member 21 that serves as an inner teeth recliner plate, and a second member 22 that serves as an outer teeth recliner plate. The inner teeth gear 15, which is a first gear, is formed integrally with the first member 21. The outer teeth gear 16, which is a second gear, is formed integrally with the second member 22.

The first member 21 and the second member 22 have generally disk-like shapes. An annular retainer 23 is coupled to the radially outer sides of the first member 21 and the second member 22. The radial direction of the first member 21 and the second member 22 will hereafter be simply referred to as the radial direction. An opposing surface 21s of the first member 21 opposes an opposing surface 22s of the second member 22. The first member 21 and the second member 22 are arranged to be rotatable relative to each other. The opposing surface 21s of the first member 21 includes a circular recess 25. The inner teeth gear 15 is formed by the inner circumference of the circular recess 25. The opposing surface 22s of the second member 22 includes an annular projection 26. The outer teeth gear 16 is formed by the outer circumference of the annular projection 26.

Figure 4:
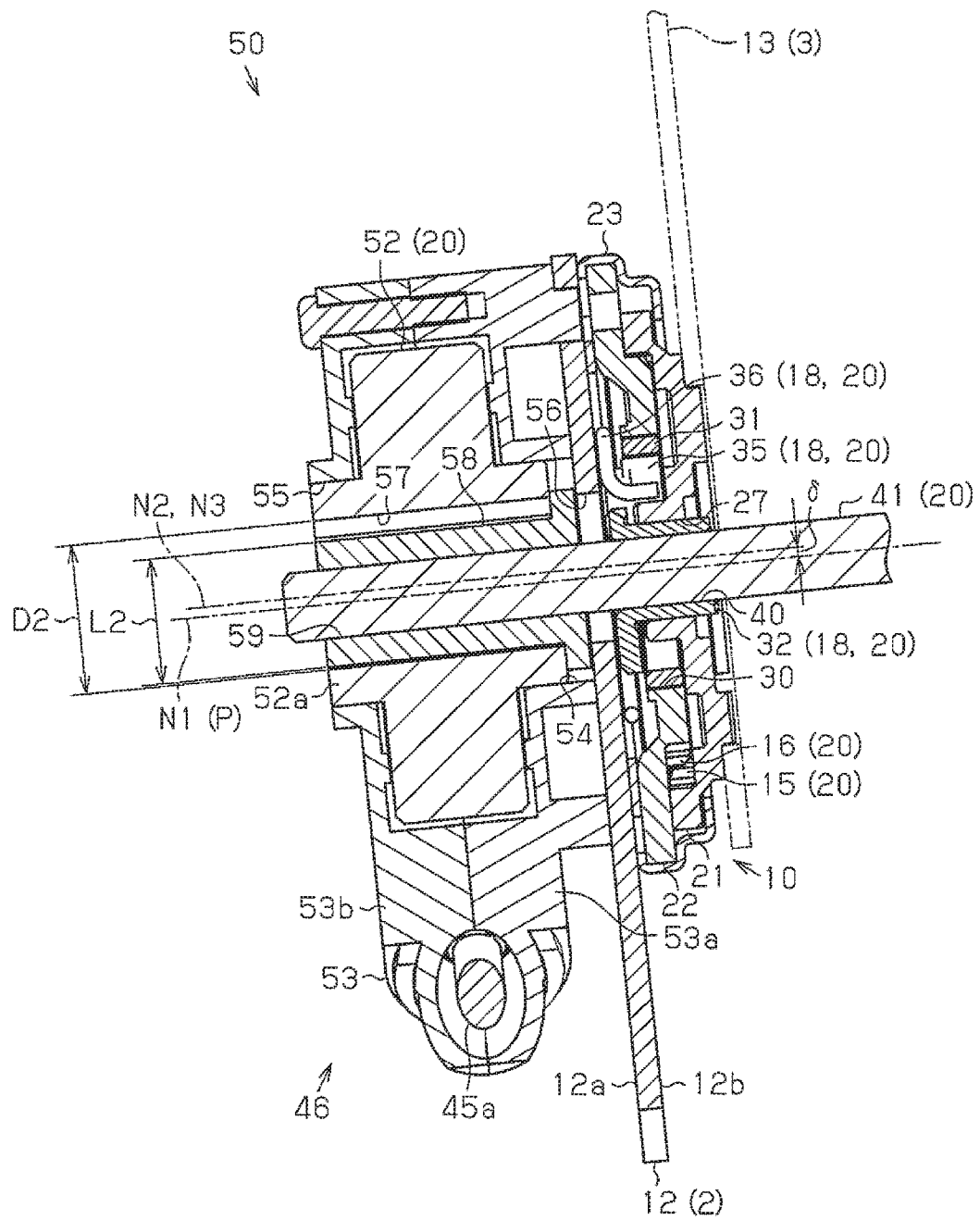
FIG. 4 is a cross-sectional view taken along line IV-IV in FIG. 3A.
Figure 5:
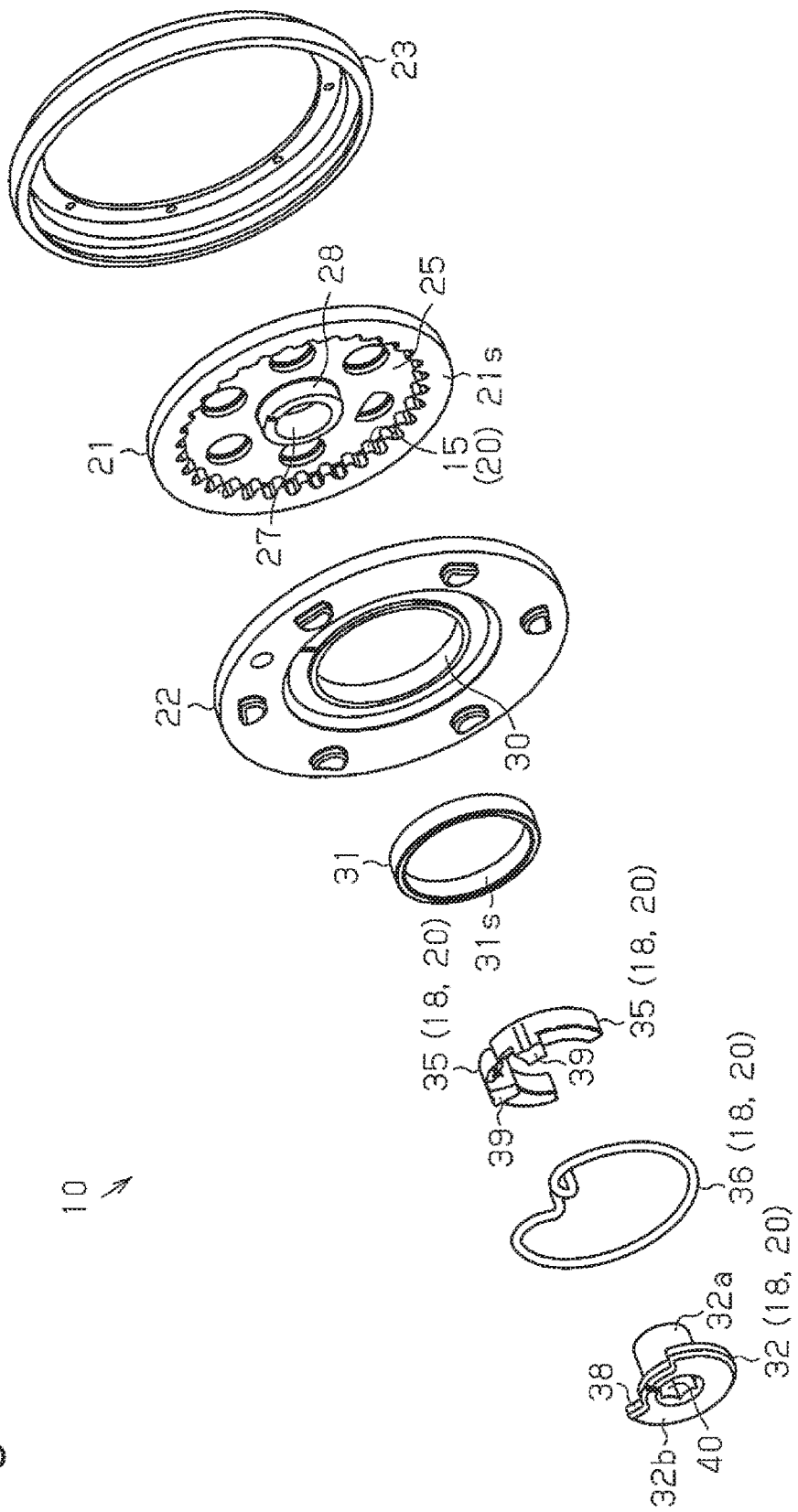
FIG. 5 is an exploded perspective view showing a reclining device.
Figure 6:
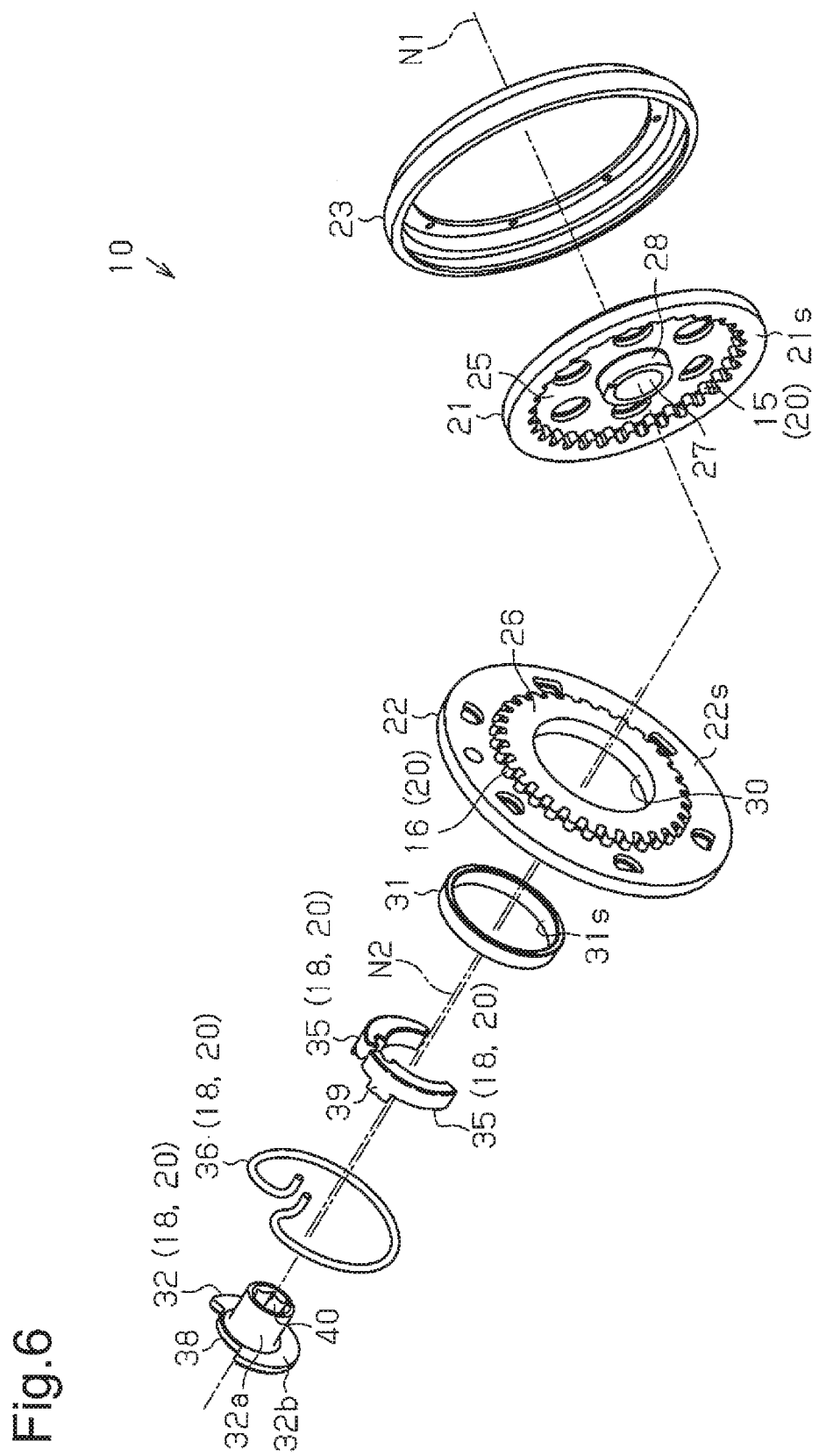
FIG. 6 is an exploded perspective view showing the reclining device.
Figure 7:
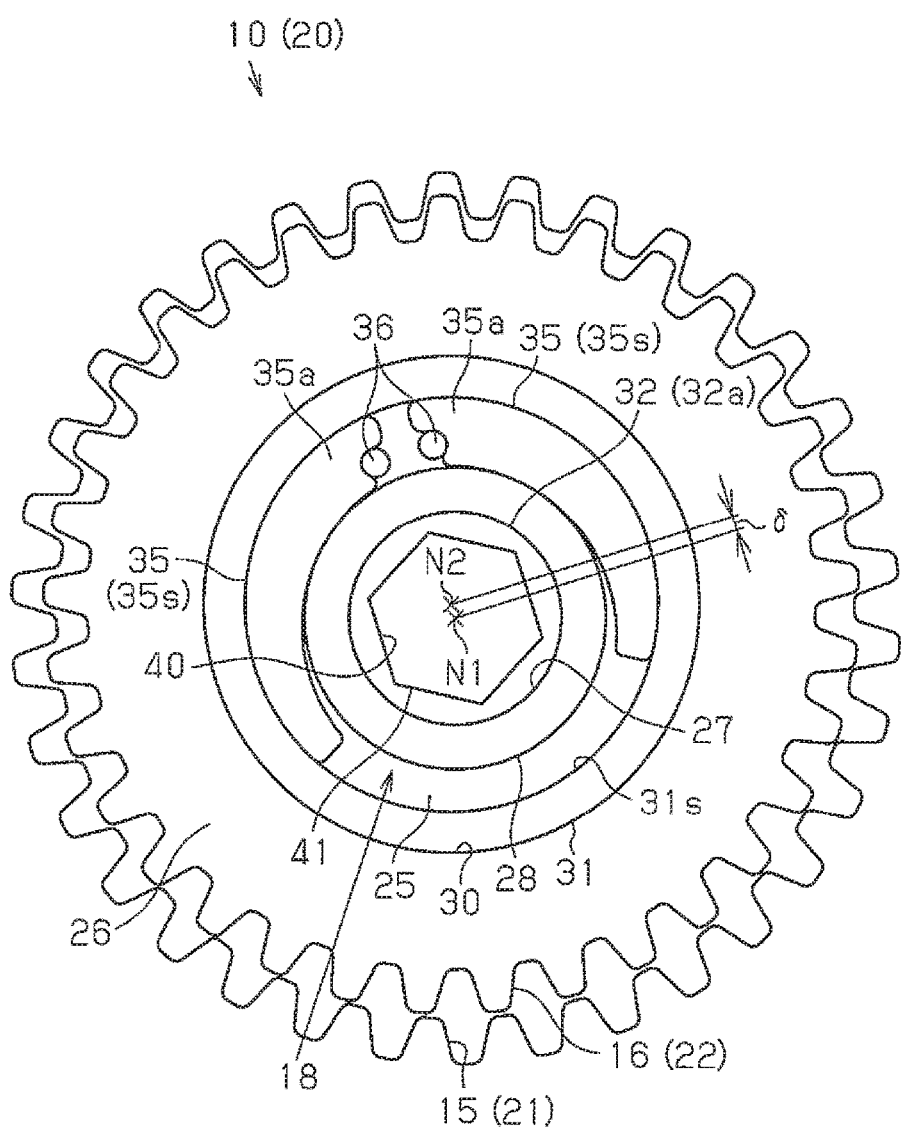
FIG. 7 schematically shows the structure of the reclining device.

A circular hole 27 extends through the central portion of the first member 21 in the thickness-wise direction of the first member 21 (sideward direction in FIG. 4). A cylinder 28, which is tubular, extends continuously from the circular hole 27 at the rim of the circular hole 27. The cylinder 28 has an axial length corresponding to the depth of the circular recess 25. Further, a circular hole 30 extends through the central portion of the second member 22 in the thickness-wise direction of the second member 22 (sideward direction in FIG. 4). The circular hole 30 is continuous with the inner circumference of the annular projection 26. The cam mechanism 18 is located in the circular hole 30.

More specifically, an annular bushing 31 is fitted into the circular hole 30 of the second member 22. The cam mechanism 18 includes a cam member 32, which includes a tubular cylinder 32a, and two wedges 35, which are arranged between an inner circumferential surface 31s of the bushing 31 and the cam member 32. The cam member 32 is inserted into the circular hole 27 of the first member 21 and supported by the first member 21. The cam member 32 is coaxial with the inner teeth gear 15 and rotatable relative to the inner teeth gear 15.

For example, each of the wedges 35 is an arcuate member including a curved pressing surface 35s. The inner circumferential surface 31s of the bushing 31 is coaxial with the outer teeth gear 16 and integrated with the outer teeth gear 16. The inner circumferential surface 31s functions as a circumferential wall. The pressing surface 35s of each wedge 35 can abut against the inner circumferential surface 31s of the bushing 31. Each wedge 35 is arranged at the radially outer side of the cylinder 32a, more specifically, the radially outer side of the cylinder 28 arranged on the rim of the circular hole 27 in the first member 21 to which the cylinder 32a is inserted, with opposing circumferential ends (proximal ends 35a) located proximate to each other.

Further, the cam mechanism 18 includes a spring 36 that biases the two wedges 35 in the direction that separates the wedges 35 from each other and presses the wedges 35 against the inner circumferential surface 31s of the bushing 31. The spring 36, which serves as a spring member, is ring-shaped and extends at the radially outer side of the cam member 32, that is, detours the cam member 32. Two ends of the spring 36 are coupled to the proximal ends 35a of the two wedges 35 that are proximate to each other as described above. Arrangement of the wedges 35 in the bushing 31 deforms the ring shape of the spring 36 and generates spring force (elastic resilient force). Based on the spring force, the cam mechanism 18 presses each wedge 35 against the inner circumferential surface 31s of the bushing 31, which is located at the radially outer side.

The cam member 32 includes a flange 32b that extends from one axial end of the cylinder 32a to the radially outer side of the cylinder 32a. The flange 32b has a generally disk-like shape and includes a cutout 38. In the cutout 38, the rim is partially cut in the circumferential direction. Each wedge 35 includes a restriction projection 39. The restriction projection 39 is arranged in the cutout 38 and abuts against the circumferential end of the cutout 38 to restrict separation of the two wedges 35 from each other in the circumferential direction. Thus, in the cam mechanism 18, each wedge 35 moves in the radial direction based on the spring force of the spring 36.

That is, each wedge 35 serving as a pressing member is located between the cam member 32 and the inner circumferential surface 31s of the bushing 31 in the radial direction as described above. The cam member 32 is coaxial with the inner teeth gear 15 (center position N1), and the inner circumferential surface 31s is coaxial with the outer teeth gear 16 (center position N2). Thus, each wedge 35 presses the inner circumferential surface 31s of the bushing 31 to generate force between the first member 21 and the second member 22 that relatively moves the first member 21 and the second member 22 in the radial direction. This allows the cam mechanism 18 to engage the inner teeth gear 15 of the first member 21 with the outer teeth gear 16 of the second member 22 in the eccentric state.

In the present embodiment, as described above, the cylinder of the cam member 32 includes a coupling hole 40 (hexagonal hole) having a hexagonal cross section. A coupling shaft 41, which extends in the lateral direction of the seat, is inserted into the coupling hole 40 (refer to FIG. 2). The coupling shaft 41 is a hexagonal shaft that includes a cross section corresponding to the hexagon of the coupling hole 40. The cam mechanisms 18 of the reclining device 10 that are arranged at lateral sides of the seat back 3 as described above are coupled to each other by the coupling shaft 41.

Further, in the present embodiment, the cam member 32 of each cam mechanism 18 receives drive torque through the coupling shaft 41. The cam mechanism 18 moves the engaged position of the inner teeth gear 15 of the first member 21 and the outer teeth gear 16 of the second member 22 in accordance with the received drive torque.

More specifically, in the cam mechanism 18 of the present embodiment, when the cam member 32 receives the drive torque that rotates the cam member 32 about the coupling shaft 41, the restriction projection 39 of the first wedge 35 of the wedges 35 inserted into the cutout 38 of the cam member 32 is pressed against the circumferential end of the cutout 38 of the flange 32b of the cam member 32. The force that presses the first wedge 35 in the circumferential direction is transmitted by the spring 36 to the second wedge 35. This rotates the wedges 35 and the spring 36 integrally with the cam member 32 about the coupling shaft 41.

Here, the direction (pressing direction) in which each wedge 35 is pressed against the inner circumferential surface 31s of the bushing 31, which is coaxial with the outer teeth gear 16, is rotated about the coupling shaft 41 serving as the rotation center of the cam member 32. The cam mechanism 18 of the present embodiment is configured to move the engaged position of the inner teeth gear 15 of the first member 21 and the outer teeth gear 16 of the second member 22 in the direction that is in accordance with the rotation direction of the cam member 32 based on the change of this pressing direction.

Further, the cam mechanism 18 of the present embodiment is configured to move the engaged position of the inner teeth gear 15 and the outer teeth gear 16 when the cam member 32 receives the drive torque that revolves the cam member 32 about the center position N2 (refer to FIG. 7) of the outer teeth gear 16 integrally with the coupling shaft 41.

More specifically, in this case, the pressing force that presses the two wedges 35, which are arranged in the revolving direction of the cam member 32, against the inner circumferential surface 31s of the bushing 31 increases in the first wedge 35 and decreases in the second wedge 35. However, the difference in the pressing force that occurs in the two wedges 35 is cancelled by the spring force of the spring 36 that couples the wedges 35 to each other when the cam member 32 is rotated about the coupling shaft 41. When the pressing direction of each wedge 35 changes, the engaged position of the inner teeth gear 15 and the outer teeth gear 16 moves in the revolving direction of the cam member 32.

The reclining device 10 of the present embodiment is capable of adjusting the inclination angle of the seat back 3 in accordance with the drive torque received by the cam mechanism 18 through the coupling shaft 41 and changes in the engaged position of the inner teeth gear 15 and the outer teeth gear 16 that occur when receiving the drive torque.

More specifically, when the cam mechanism 18 does not receive drive torque, each wedge 35 presses the inner circumferential surface 31s of the bushing 31 in accordance with the spring force of the spring 36. This maintains the engaged position of the outer teeth gear 16 of the second member 22 and the inner teeth gear 15 of the first member 21. In the reclining device 10 of the present embodiment, the inclination angle of the seat back 3 can be maintained by restricting relative rotation of the first member 21, which is fixed to the seat back 3, and the second member 22, which is fixed to the seat cushion 2.

The engaged position of the inner teeth gear 15 and the outer teeth gear 16 moves when the cam mechanism 18 receives drive torque through the coupling shaft 41. This changes the rotational position of the first member 21, which includes the inner teeth gear 15, relative to the second member 22, which includes the outer teeth gear 16. As a result, in the reclining device 10 of the present embodiment, the inclination angle of the seat back 3 can be changed.

Specifically, in the present embodiment, the outer teeth gear 16, which is fixed at the side of the seat cushion 2, is a fixed element that is non-rotatable. Thus, referring to FIG. 7, the first member 21, which is fixed at the side of the seat back 3, swings and rotates over a predetermined eccentricity amount δ that is set between the inner teeth gear 15 (center position N1) and the outer teeth gear 16 (center position N2) of the second member 22.

The drive rotation produced by the drive torque that is received by the cam mechanism 18 through the coupling shaft 41 is decelerated at a deceleration ratio that is in accordance with the difference in the number of teeth (teeth number) between the inner teeth gear 15 and the outer teeth gear 16. That is, the deceleration device 20, which includes the inner teeth gear 15, the outer teeth gear 16, and the cam mechanism 18, is configured so that the inner teeth gear 15 is rotated relative to the outer teeth gear 16 by the degree corresponding to the difference in the number of teeth (for example, one or two) per rotation of the cam mechanism 18. This allows the reclining device 10 of the present embodiment to smoothly change the inclination angle of the seat back 3 even when the received drive torque is relatively small.

In further detail, as shown in FIGS. 1 and 2, the seat 1 of the present embodiment includes an actuator device 46 that uses a motor 45 as a drive source. A seat drive device 50 is capable of adjusting the inclination angle of the seat back 3 with the motor drive by transmitting the drive torque that is output by the actuator device 46 through the coupling shaft 41 to the cam mechanism 18 of the reclining device 10.

Figure 8:
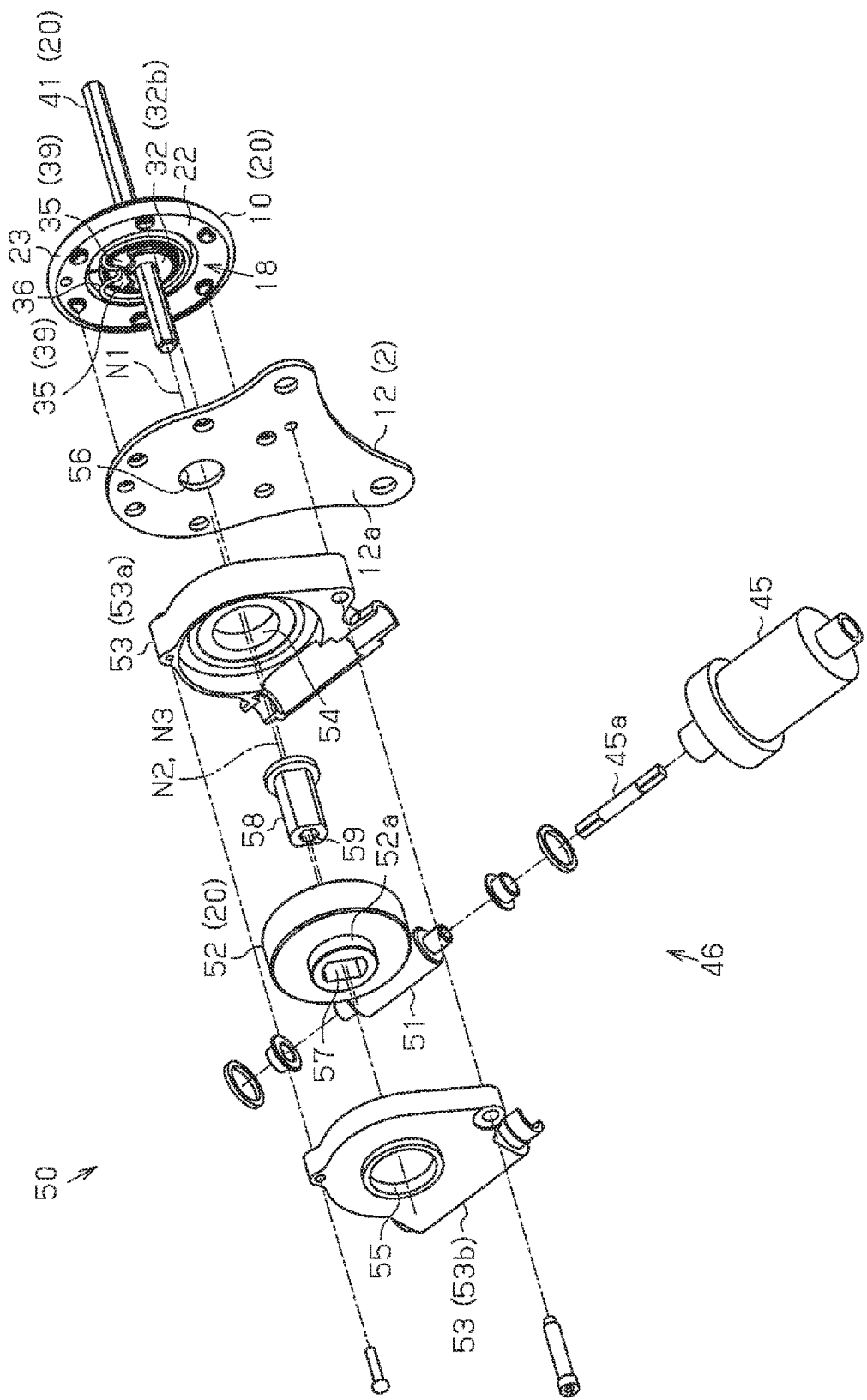
FIG. 8 is an exploded perspective view showing the first embodiment of the seat drive device.

As shown in FIGS. 4 and 8, the actuator device 46 of the present embodiment includes a worm 51, a wheel 52, and a case 53. The worm 51 is coupled to a motor shaft 45a and rotated integrally with the motor shaft 45a. The wheel 52 is engaged with the worm 51. The case 53 rotationally accommodates the worm 51 and the wheel 52. The case 53 is arranged at the side of the seat cushion 2 and fastened to an outer surface 12a of the supporting plate 12.

In the present embodiment, the case 53 serving as a support is formed by coupling a first accommodation member 53a and a second accommodation member 53b, which are separated along the axis of the worm 51. The first accommodation member 53a and the second accommodation member 53b respectively include circular holes 54 and 55 into which a rotation shaft 52a of the wheel 52 is inserted. In the present embodiment, the wheel 52 is accommodated in the case 53 so that the case 53 rotationally supports the wheel 52.

In the present embodiment, the supporting plate 12 to which the actuator device 46 is fixed as described above includes a through hole 56, which extends through the supporting plate 12 in the thickness-wise direction. A first shaft end of the coupling shaft 41 that couples the cam mechanisms 18 of the reclining devices 10 to each other is inserted through the through hole 56. The actuator device 46 is configured to couple the wheel 52, which serves as a connection portion, to the first shaft end of the coupling shaft 41 that projects from the outer surface 12a of the supporting plate 12 through the through hole 56.

More specifically, in the present embodiment, the wheel 52 of the actuator device 46 functions as a rotor capable of inputting the drive torque to the cam mechanism 18 of each reclining device 10 through the coupling shaft 41. This allows the seat drive device 50 of the present embodiment to synchronically operate the reclining devices 10 arranged at the lateral sides of the seat back 3 in accordance with the drive torque that is output by the actuator device 46.

Specifically, the actuator device 46 of the present embodiment is fixed to the outer surface 12a of the supporting plate 12 so that the actuator device 46 is located at a position corresponding to the reclining device 10 located at the side of an inner surface 12b of the supporting plate 12. In detail, the wheel 52 of the actuator device 46 is coaxial with the outer teeth gear 16 of the second member 22 fixed to the supporting plate 12. Thus, in the present embodiment, the coupling shaft 41 is coupled to the wheel 52 at the eccentric position P that corresponds to the eccentricity amount δ set between the inner teeth gear 15 (center position N1) and the outer teeth gear 16 (center position N2).

More specifically, in the present embodiment, the cam member 32 of the cam mechanism 18 coupled to the coupling shaft 41 as described above revolves around the center position N2 of the outer teeth gear 16, which is coaxial with the wheel 52, when the wheel 52 serving as a rotor rotates. This allows the seat drive device 50 of the present embodiment to adjust the inclination angle of the seat back 3 relative to the seat cushion 2 in accordance with the drive torque transmitted from the wheel 52 through the coupling shaft 41 to the cam mechanism 18 of each reclining device 10.

More specifically, as shown in FIGS. 2 to 4 and 8, in the present embodiment, the wheel 52 includes an elongated hole 57 that extends through the wheel 52 in the thickness-wise direction (sideward direction in FIG. 4). The elongated hole 57 extends in the radial direction (vertical direction in FIG. 4) through the rotation center N3 that is coaxial with the center position N2 of the outer teeth gear 16. When the coupling shaft 41 is inserted into the elongated hole 57, the wheel 52 is coupled to the coupling shaft 41 at the eccentric position P corresponding to the eccentricity amount δ set between the inner teeth gear 15 and the outer teeth gear 16.

Specifically, in the present embodiment, an insertion body 58 (bushing) that is movable in the longitudinal direction in the elongated hole 57 is arranged in the elongated hole 57. The insertion body 58 has an oval or oblong cross-sectional shape. The insertion body 58 includes a coupling hole 59 that extends through the insertion body 58 in the axial direction. In the same manner as the coupling hole 40 of the cam member 32, the coupling hole 59 is a hexagonal hole including a hexagonal cross section corresponding to the cross section of the coupling shaft 41 (refer to FIGS. 5 and 6). When the coupling shaft 41 is inserted into the coupling hole 59, the wheel 52 of the present embodiment is coupled to the coupling shaft 41 by the insertion body 58 arranged in the elongated hole 57.

Figure 3B:
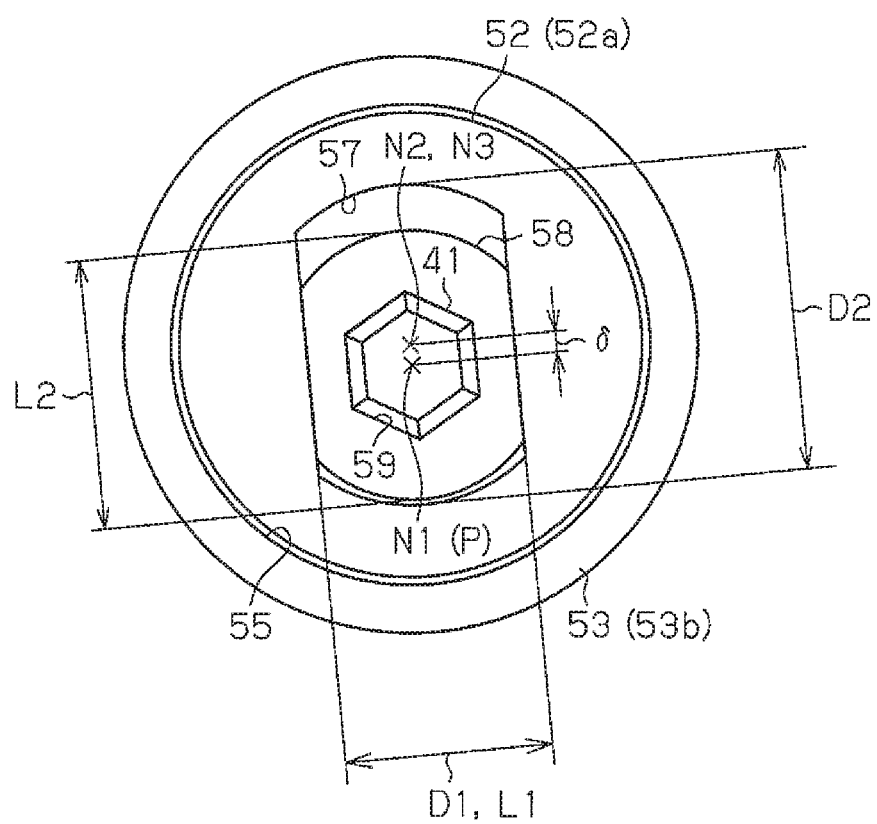
FIG. 3B is an enlarged view showing a portion where a wheel is coupled to a coupling shaft in the first embodiment.

As shown in FIG. 3B, the minor axis D1 of the elongated hole 57 is substantially equal to the lateral length L1 of the cross-sectional shape of the insertion body 58, that is, the oval or oblong shape (D1≈L1). The major axis D2 of the elongated hole 57 is longer than the longitudinal length L2 of the cross-sectional shape of the insertion body 58. (D2>L2). In the present embodiment, this couples the wheel 52 to the coupling shaft 41 in a manner enabling torque transmission while allowing for relative movement of the wheel 52 and the coupling shaft 41 in the longitudinal direction of the elongated hole 57.

The operation of the seat drive device 50 will now be described.

The actuator device 46 of the present embodiment decelerates the rotation produced by the motor 45, which serves as a drive source, with the worm 51 and the wheel 52 and outputs the decelerated rotation. The coupling shaft 41 is coupled to the wheel 52 at the eccentric position P that corresponds to the eccentric eccentricity amount δ set between the inner teeth gear 15 and the outer teeth gear 16. The cam member 32 of the cam mechanism 18 is coaxial with the inner teeth gear 15, and the outer teeth gear 16 is coaxial with the wheel 52. When the wheel 52 rotates, the coupling shaft 41 revolves about the center position N2 of the outer teeth gear 16 integrally with the cam member 32. This moves the engaged position of the inner teeth gear 15 and the outer teeth gear 16. The second member 22 including the outer teeth gear 16 is fixed to the seat cushion 2, and the first member 21 including the inner teeth gear 15 is fixed to the seat back 3. The first member 21 swings and rotates relative to the second member 22. This allows the seat drive device 50 of the present embodiment to adjust the inclination angle of the seat back 3 based on the deceleration ratio of the deceleration device 20.

The first embodiment has the advantages described below.

(1) The deceleration device 20 is located between the seat cushion 2 and the seat back 3 and functions as the reclining device 10. The deceleration device 20 includes the inner teeth gear 15, the outer teeth gear 16, and the cam mechanism 18 used to engage the inner teeth gear 15 (first gear) with the outer teeth gear 16 (second gear) in the eccentric state. The number of teeth of the inner teeth gear 15 differs from the number of teeth of the outer teeth gear 16. The deceleration device 20 includes the coupling shaft 41 and the wheel 52. The coupling shaft 41 is coupled to the cam mechanism 18 and coaxial with the inner teeth gear 15. The wheel 52 functions as a rotor capable of inputting the drive torque that moves the engaged position of the inner teeth gear 15 and the outer teeth gear 16 through the coupling shaft 41 to the cam mechanism 18. The elongated hole 57 of the wheel 52 extends in the radial direction through the rotation center N3 that is coaxial with the center position N2 of the outer teeth gear 16. When the coupling shaft 41 is inserted into the elongated hole 57, the wheel 52 is coupled to the coupling shaft 41 at the eccentric position P that corresponds to the eccentricity amount δ set between the inner teeth gear 15 and the outer teeth gear 16. The major axis D2 of the elongated hole 57 allows for movement of the wheel 52 relative to the coupling shaft 41 in the longitudinal direction.

In the deceleration device 20, when the first gear of the inner teeth gear 15 and the outer teeth gear 16 is set as a reference, the second gear virtually swings and rotates over the predetermined eccentricity amount δ set between the inner teeth gear 15 and the outer teeth gear 16. The coupling shaft 41 is coupled to the cam mechanism 18 and coaxial with the inner teeth gear 15. Thus, since the outer teeth gear 16 is a fixed element, the coupling shaft 41 swings and rotates integrally with the inner teeth gear 15 serving as an output element revolving about the center position N2 of the outer teeth gear 16.

However, in the first embodiment, the coupling shaft 41 is inserted into the elongated hole 57 of the wheel 52. This allows the wheel 52 to be easily coupled to the coupling shaft 41 at the eccentric position P corresponding to the eccentricity amount δ set between the inner teeth gear 15 and the outer teeth gear 16. Thus, the drive torque is efficiently transmitted from where the outer teeth gear 16 is fixed (seat cushion 2) to the cam mechanism 18.

Further, since relative movement is allowed between the wheel 52 and the coupling shaft 41 in the longitudinal direction of the elongated hole 57, the cam mechanism 18 used to engage the inner teeth gear 15 with the outer teeth gear 16 automatically adjusts the eccentric position P of the coupling shaft 41 relative to the wheel 52 (rotation center N3) that is coaxial with the outer teeth gear 16 (center position N2). This absorbs the manufacturing and coupling errors and the changes in the eccentricity amount δ that are caused by wear over time or the like and further ensures smooth movement.

(2) The insertion body 58 (bushing) that is movable in the elongated hole 57 in the longitudinal direction is arranged in the elongated hole 57. The wheel 52 is coupled to the coupling shaft 41 by the insertion body 58.

In this case, the wheel 52 and the coupling shaft 41 are relatively movable in the longitudinal direction of the elongated hole 57 further smoothly. This ensures smoother movement of the deceleration device 20.

In addition, there is an advantage in that the wheel 52 can be easily coupled coaxially to the coupling shaft 41 by inserting a second insertion body (adapter) that is immovable in the elongated hole 57 instead of the insertion body 58. Thus, just by replacing an insertion body in the elongated hole 57 without making a significant modification, this allows for application to a structure in which the drive torque is transmitted from where the inner teeth gear 15 is fixed to the cam mechanism 18, that is, a structure in which the actuator device is located at the side of the seat back 3. In this case, it is preferred that the longitudinal length in the cross section of the adapter be substantially equal to the major axis D2 of the elongated hole 57 and that the coupling hole 59 coupling the wheel 52 to the coupling shaft 41 be located at the position corresponding to the rotation center N3 of the wheel 52. Thus, components may be shared in multiple products that differ in the arrangement of the drive source. This reduces manufacturing costs.

(3) The cam mechanism 18 includes the cam member 32 and the two wedges 35. The cam member 32 is coaxial with the outer teeth gear 16 and arranged at the inner side of the inner circumferential surface 31s of the bushing 31, which is integrated with the outer teeth gear 16. That is, the cam member 32 is surrounded by the inner circumferential surface 31s. The two wedges 35 are arranged between the cam member 32 and the inner circumferential surface 31s of the bushing 31. Further, the cam mechanism 18 includes the spring 36. The spring 36 biases the two wedges 35 in the direction that separates the two wedges 35 from each other and presses the two wedges 35 against the inner circumferential surface 31s of the bushing 31.

In this case, the spring force of the spring 36 results in the inner teeth gear 15 being engaged with the outer teeth gear 16 in the eccentric state. The drive torque received by the cam member 32 moves the engaged position of the inner teeth gear 15 and the outer teeth gear 16. Further, even when the cam mechanism 18 does not receive the drive torque, the spring force of the spring 36 maintains the rotational position of the inner teeth gear 15 relative to the outer teeth gear 16. Thus, when such a structure is applied to the reclining device 10, the seat drive device 50 has superior energy efficiency.

(4) The reclining device 10 includes the first member 21 that includes the inner teeth gear 15 and is fixed to the seat back 3 and the second member 22 that includes the outer teeth gear 16 and is fixed to the seat cushion 2. The actuator device 46 that decelerates the rotation produced by the motor 45 with the worm 51 and the wheel 52 and outputs the decelerated rotation is arranged at the side of the seat cushion 2. The actuator device 46 is coaxial with the outer teeth gear 16 that is fixed by the supporting plate 12 of the seat cushion 2. The actuator device 46 includes the case 53 serving as a support that rotationally supports the wheel 52.

In this case, drive torque is efficiently transmitted from the seat cushion 2, to which the outer teeth gear 16 serving as a non-rotatable fixed element is fixed, to the cam mechanism 18 serving as an input element that swings and rotates with the inner teeth gear 15. The motor 45 is arranged at the side of the seat cushion 2 to increase the degree of layout freedom.

Second Embodiment

A second embodiment of a deceleration device applied to a vehicle seat drive device will now be described with reference to the drawings. In the second embodiment, like or same reference numerals are given to those components that are the same as the corresponding components of the first embodiment. Such components will not be described in detail.

Figure 9:
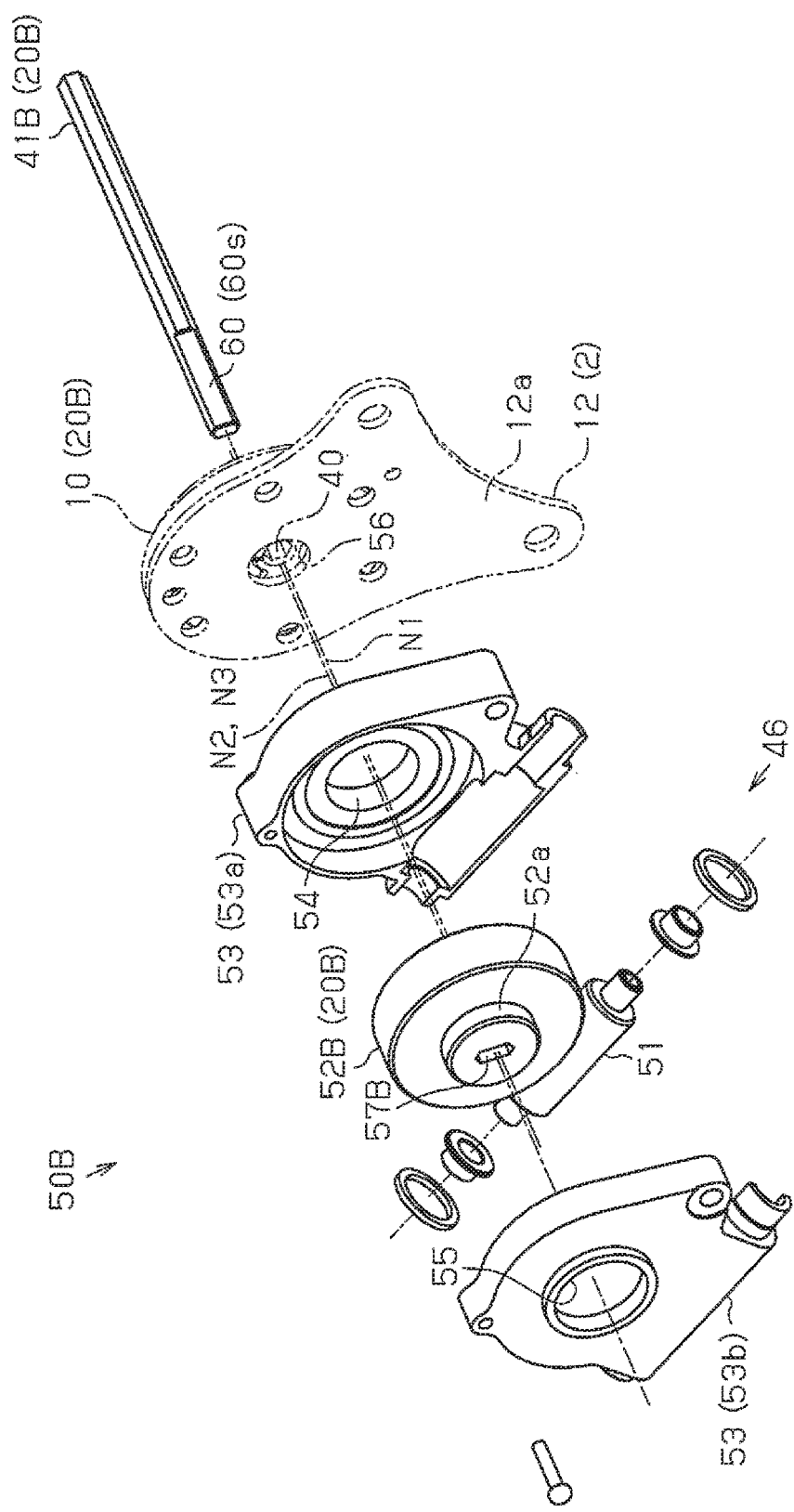
FIG. 9 is an exploded perspective view showing a second embodiment of a seat drive device.
Figure 10A:
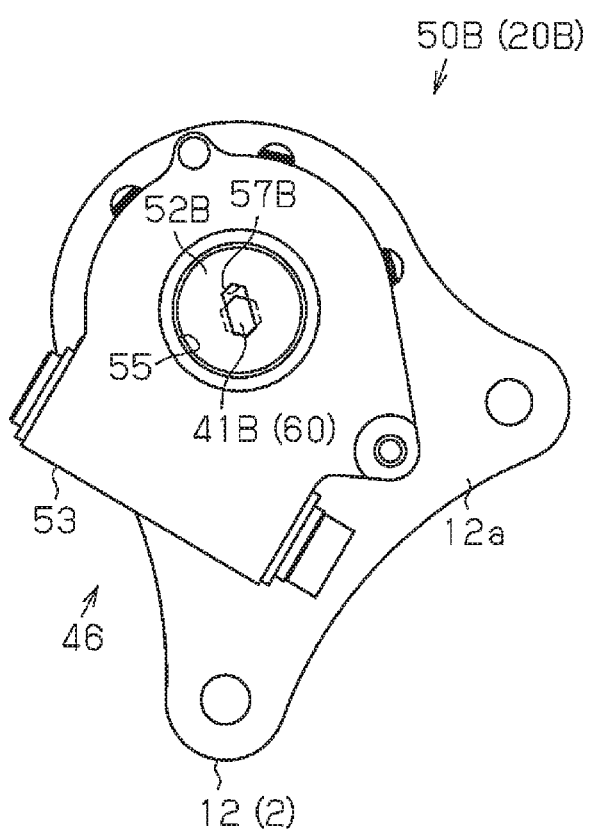
FIG. 10A is a side view showing the second embodiment of the seat drive device.
Figure 10B:
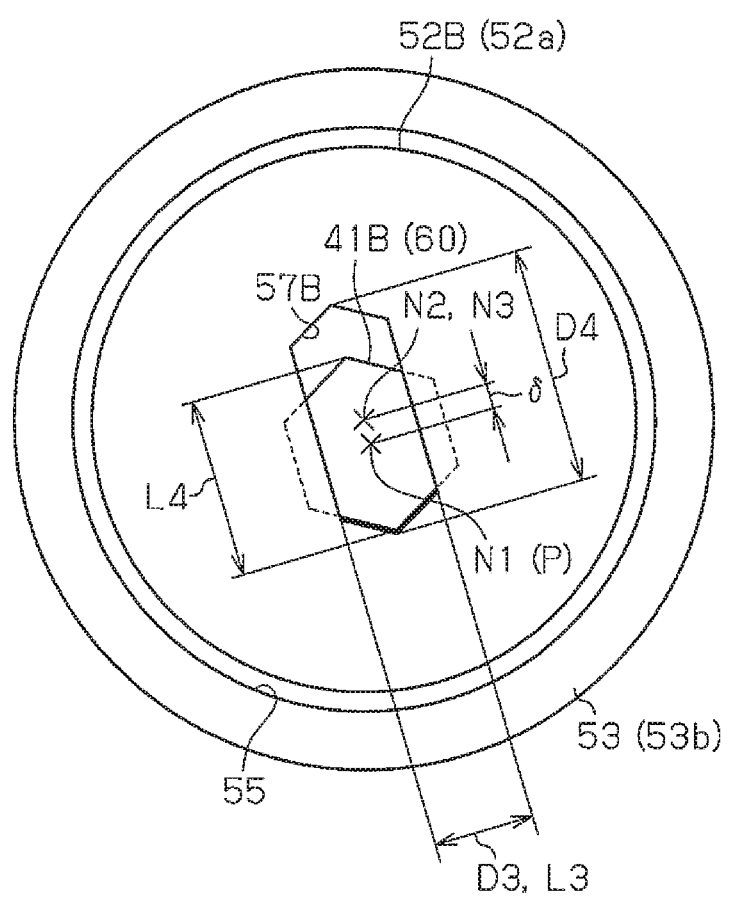
FIG. 10B is an enlarged view showing a portion where a wheel is coupled to a coupling shaft in the second embodiment.

As shown in FIGS. 9, 10A and 10B, in the same manner as the seat drive device 50 of the first embodiment, a seat drive device 50B of the second embodiment synchronically operates the reclining devices 10 at the lateral sides of the seat back 3 in accordance with the drive torque that is output by the actuator device 46 fixed to the side of the seat cushion 2.

In the second embodiment, a coupling shaft 41B that couples the reclining devices 10 (cam mechanisms 18) to each other includes a first shaft end defining a double-plane portion 60 including two parallel flat surfaces 60s. In detail, the first shaft end projects from the outer surface 12a of the supporting plate 12 when inserted through the through hole 56 of the supporting plate 12 to which the actuator device 46 is fixed. Further, a wheel 52B of the second embodiment includes an elongated hole 57B in the same manner as the wheel 52 of the first embodiment. The elongated hole 57B extends in the radial direction through the rotation center N3 that is coaxial with the center position N2 of the outer teeth gear 16. In the second embodiment, the minor axis D3 of the elongated hole 57B is substantially equal to the lateral length L3 in the cross section of the double-plane portion 60, which is arranged at the first shaft end of the coupling shaft 41B (D3≈L3).

That is, in the deceleration device 20B, the double-plane portion 60 at the first shaft end of the coupling shaft 41B is directly inserted into the elongated hole 57B of the wheel 52B serving as a rotor.

The major axis D4 of the elongated hole 57B is set to be larger than the longitudinal length L4 in the cross section of the double-plane portion 60. Thus, the wheel 52B of the second embodiment is coupled to the coupling shaft 41B in a manner enabling torque transmission while allowing for relative movement of the elongated hole 57B in the longitudinal direction.

Accordingly, the deceleration device 20B of the second embodiment has the same advantages as the deceleration device 20 of the first embodiment. In the second embodiment, the structure is simplified since the insertion body 58 (refer to FIG. 3) is omitted. This reduces the manufacturing costs as compared with the first embodiment.

Third Embodiment

A third embodiment of a deceleration device applied to a vehicle seat drive device will now be described with reference to the drawings. In the third embodiment, like or same reference numerals are given to those components that are the same as the corresponding components of the first and second embodiments. Such components will not be described in detail.

Figure 11:
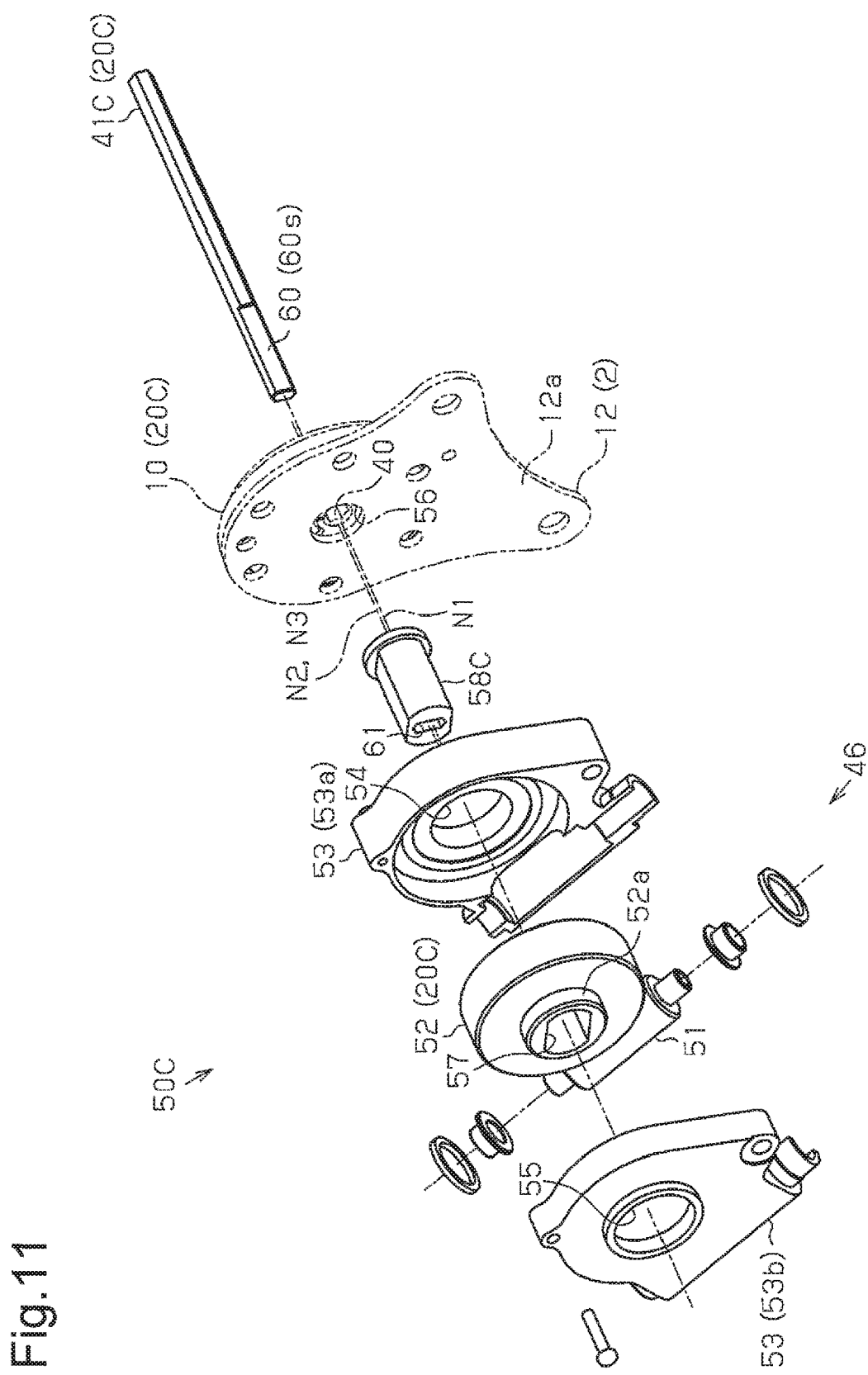
FIG. 11 is an exploded perspective view showing a third embodiment of a seat drive device.
Figure 12A:
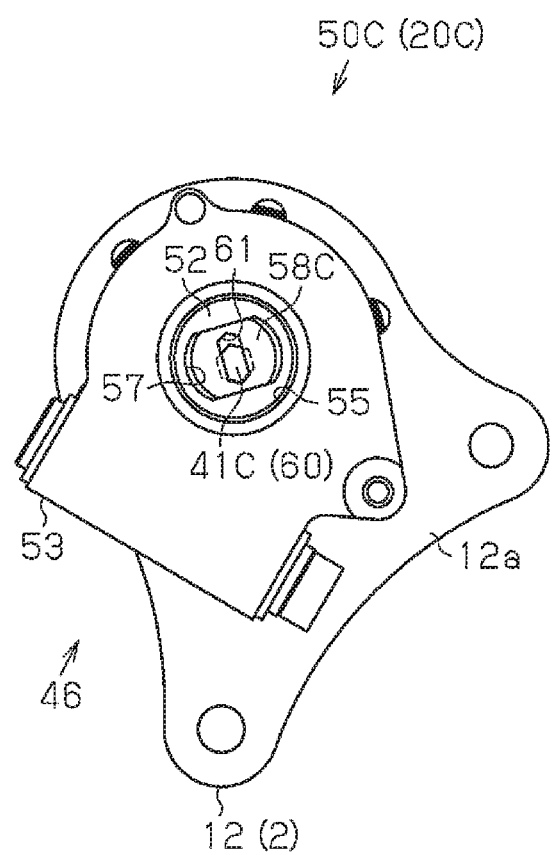
FIG. 12A is a side view showing the third embodiment of the seat drive device.
Figure 12B:
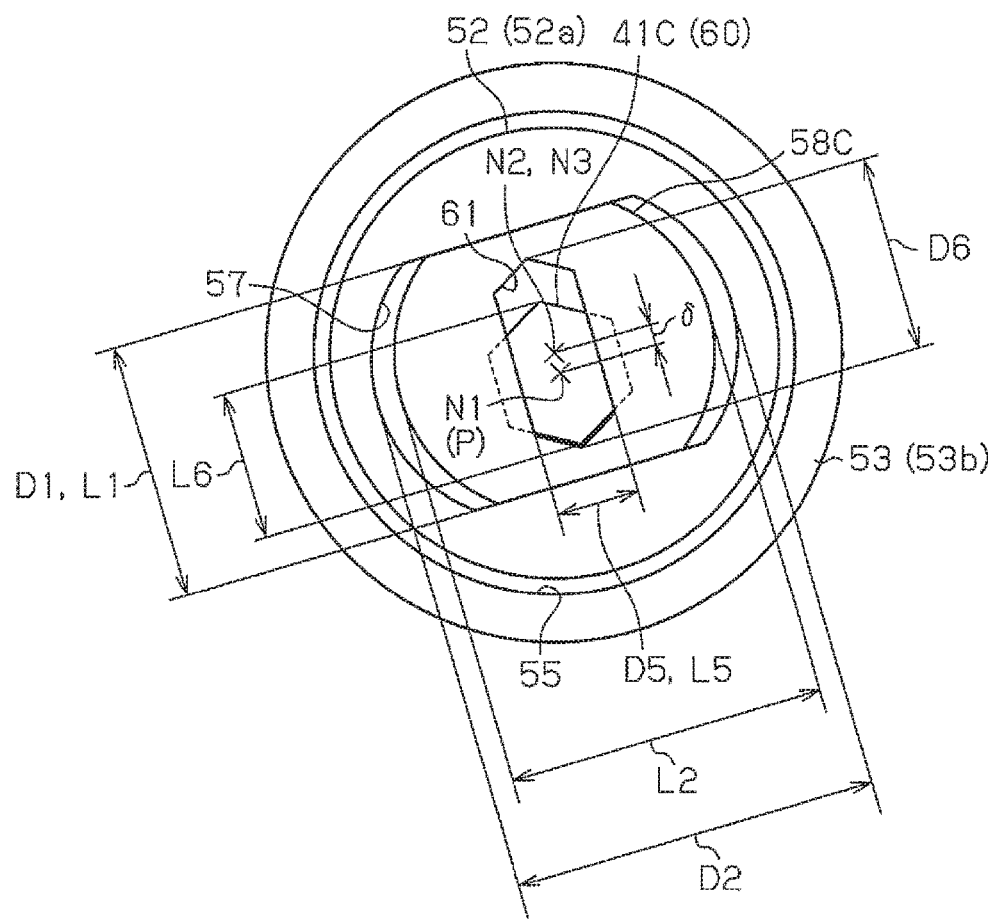
FIG. 12B is an enlarged view showing a portion where a wheel is coupled to a coupling shaft in the third embodiment.

As shown in FIGS. 11, 12A, and 12B, in a seat drive device 50C of the third embodiment, a deceleration device 20C that functions as the reclining device 10 includes an insertion body 58C (bushing) in the same manner as the deceleration device 20 of the first embodiment. The insertion body 58C is inserted into the elongated hole 57 of the wheel 52 and movable in the elongated hole 57 in the longitudinal direction. The double-plane portion 60 is arranged at a first shaft end of a coupling shaft 41C in the same manner as the coupling shaft 41B of the second embodiment. The insertion body 58C includes a second elongated hole 61 that extends through the insertion body 58C in the axial direction. The double-plane portion 60 is inserted into the second elongated hole 61.

Specifically, the second elongated hole 61 extends in the direction intersecting the longitudinal direction of the elongated hole 57 into which the insertion body 58C including the second elongated hole 61 is inserted, that is, the direction that is substantially orthogonal to the longitudinal direction of the elongated hole 57. The minor axis D5 of the second elongated hole 61 is substantially equal to the lateral length L5 in the cross section of the double-plane portion 60 inserted into the second elongated hole 61 (D5≈L5). The major axis D6 of the second elongated hole 61 is larger than the longitudinal length L6 in the cross section of the double-plane portion 60 (D6>L6). This allows the coupling shaft 41C, which is inserted into the second elongated hole 61, to move in the longitudinal direction of the second elongated hole 61.

That is, the third embodiment allows for relative movement of the wheel 52 and the insertion body 58C in the longitudinal direction of the elongated hole 57 and relative movement of the insertion body 58C and the coupling shaft 41C in the longitudinal direction of the second elongated hole 61. This forms a simple Oldham coupling and thus allows the deceleration device 20C to adjust the eccentric position P of the coupling shaft 41 relative to the wheel 52 (rotation center N3), which is coaxial with the outer teeth gear 16 (center position N2), in a further flexible manner.

Accordingly, the deceleration device 20C of the third embodiment has the same advantages as the deceleration device 20 of the first embodiment. The superior eccentric position adjustment function ensures smoother movement. Further, wherever the rotational position of the inner teeth gear 15 relative to the outer teeth gear 16 is located, the coupling shaft 41C is coupled to the cam mechanism 18. In particular, the seat drive device 50C does not have to perform a process of setting the inclination angle of the seat back 3 at a predetermined position when coupling is performed. This facilitates the coupling and thus increases the working efficiency.

The above embodiment may be changed as described below.

In each of the above embodiments, the cam mechanism 18 includes the cam member 32, the two wedges 35 serving as pressing members, and the spring 36 serving as a spring member. However, the cam mechanism 18 is not limited in such a manner as long as the cam mechanism 18 is coaxial with the inner teeth gear 15 and rotationally supported by the inner teeth gear 15, allows the inner teeth gear 15 to be engaged with the outer teeth gear 16 in the eccentric state, and receives the drive torque to move the engaged position of the inner teeth gear 15 and the outer teeth gear 16.

In each of the above embodiments, the circumferential wall to which each of the wedges 35 serving as pressing members is pressed is formed by fitting the annular bushing 31 into the circular hole 30 of the second member 22. However, the circumferential wall may be changed to any form. For example, each wedge 35 may be directly pressed against the inner circumferential surface of the circular hole 30.

In each of the above embodiments, the difference in the number of teeth of the inner teeth gear 15 and the outer teeth gear 16 is set to one or two. However, the difference may be changed to any value.

In each of the above embodiments, the rotor capable of inputting the drive torque to the cam mechanism 18 through the coupling shaft 41 (41B or 41C) is the wheel 52 (52B) of the actuator device 46. Instead, the rotor may be a different deceleration gear. Further, the rotor may be separate from the actuator device 46.

The seat drive device 50 (50B or 50C) of each of the above embodiments operates the deceleration device 20 (20B or 20C) that functions as the reclining device 10 in accordance with the drive torque that is output by the actuator device 46 arranged at the side of the seat cushion 2. Instead, the deceleration device 20 between the two seat members such as an ottoman device or a seat tilting device may change the relative rotational position (pivoting position) of the two seat members in accordance with the drive torque output by the actuator device. In such a case, the two seat members are relatively rotated smoothly by a relatively small drive torque. Further, a single actuator device may operate movable portions. This simplifies the structure and allows for effective use of the space.

In the first embodiment, the cross-sectional shapes of the coupling shaft 41 and the coupling hole 59 of the wheel 52 are hexagonal. Instead of a hexagonal shape, the cross-sectional shape may be, for example, tetragonal or dodecagonal as long as the coupling shaft 41 is coupled to the wheel 52 in a manner enabling torque transmission. Alternatively, the coupling shaft 41 may be coupled to the wheel 52 through serration fitting or the like in a non-rotatable manner. Further, the coupling hole 40 of the cam member 32 into which the coupling shaft 41 is inserted may have any shape corresponding to the cross section of the coupling shaft 41.

In each of the above embodiments, the outer teeth gear 16 is a fixed element, and the inner teeth gear 15 is an output element. Instead, the inner teeth gear 15 may be a fixed element, and the outer teeth gear 16 may be an output element. That is, the first member 21 including the inner teeth gear 15 may be fixed to the seat cushion 2, and the second member 22 including the outer teeth gear 16 may be fixed to the seat back 3. The actuator device 46 may be arranged at the side of the seat back 3.

In each of the above embodiments, the first member 21 includes the first gear including inner teeth (inner teeth gear 15), and the second member 22 includes the second gear including outer teeth (outer teeth gear 16). Instead, the first member 21 may include the first gear including outer teeth, and the second member 22 may include the second gear including inner teeth.

More specifically, the first gear, which is coaxial with the cam mechanism 18 (cam member 32) and the coupling shaft 41 (41B and 41C), may be an outer teeth gear, and the second gear, which is coaxial with the bushing 31 serving as a circumferential wall and the wheel 52 (52B) serving as a rotor, may be an inner teeth gear.

The invention claimed is:

1. A deceleration device comprising:
a first gear including either one of inner teeth and outer teeth and having a first number of teeth;
a second gear including the other one of the inner teeth and the outer teeth and having a second number of teeth, which differs from the first number of teeth;
a cam mechanism that is arranged coaxially with the first gear and rotationally supported by the first gear, wherein the cam mechanism is configured to cause the first gear to be engaged with the second gear in an eccentric state and receive drive torque to move a position where the first gear and the second gear are engaged;
a coupling shaft that is arranged coaxially with the first gear and coupled to the cam mechanism; and
a rotor that is arranged coaxially with the second gear and coupled to the coupling shaft, wherein the rotor is configured to enable the drive torque to be received by the cam mechanism through the coupling shaft, wherein
the rotor includes a first elongated hole that extends in a radial direction through a rotation center and is configured to allow the coupling shaft to be inserted into the first elongated hole, and when the coupling shaft is inserted into the first elongated hole, the rotor is coupled to the coupling shaft at an eccentric position corresponding to an eccentricity amount that is set between the first gear and the second gear, and
the first elongated hole has a major axis set to allow relative movement of the rotor and the coupling shaft in a longitudinal direction of the first elongated hole.

2. The deceleration device according to claim 1, wherein the rotor includes an insertion body that is movable in the first elongated hole in the longitudinal direction, and
the rotor is configured to be coupled to the coupling shaft by the insertion body.

3. The deceleration device according to claim 2, wherein the insertion body includes a second elongated hole that extends in a direction intersecting the longitudinal direction of the first elongated hole, and
the coupling shaft is configured to be inserted into the second elongated hole and be movable relative to the second elongated hole in a longitudinal direction of the second elongated hole.

4. The deceleration device according to claim 1, wherein the cam mechanism includes:
a cam member surrounded by a circumferential wall that is arranged coaxially with the second gear and is arranged integrally with the second gear;
two pressing members located between the cam member and the circumferential wall; and
a spring member that biases the two pressing members in a direction that separates the two pressing members from each other and presses the two pressing members against the circumferential wall.

5. The deceleration device according to claim 1, wherein the coupling shaft includes a double-plane portion including two parallel flat surfaces.

6. The deceleration device according to claim 5, wherein a major axis of the first elongated hole is larger than a longitudinal length in a cross section of the double-plane portion.

7. A seat drive device comprising the deceleration device according to claim 1 located between two seat members.

8. The seat drive device according to claim 7, wherein the first gear is fixed to a first seat member of the two seat members, and
the second gear is fixed to a second seat member in a non-rotatable manner.

9. The seat drive device according to claim 8, further comprising a support that is fixed to the second seat member and arranged coaxially with the second gear to rotationally support the rotor.

* * * * *